_350-171._

_01-11-72     OR     3,633,999_

SR

United States Patent

[11] 3,633,999

[72] Inventor Richard G. Buckles
491 Middle Court, Menlo Park, Calif. 94025
[21] Appl. No. 58,320
[22] Filed July 27, 1970
[45] Patented Jan. 11, 1972

[54] REMOVING SPECKLE PATTERNS FROM OBJECTS ILLUMINATED WITH A LASER
2 Claims, 4 Drawing Figs.

[52] U.S. Cl. .................................................. 350/171, 350/3.5
[51] Int. Cl. .................................................. G02b 27/14
[50] Field of Search .................................................. 350/3.5, 162 R, 160, 163, 169, 171, 172

[56] References Cited
UNITED STATES PATENTS
3,447,856   6/1969   Delange ........................ 350/169

OTHER REFERENCES
Ogden et al., IBM Technical Disclosure Bulletin Vol. 12, No. 12 May 1970, pp. 2297–2298

*Primary Examiner*—David Schonberg
*Assistant Examiner*—Ronald J. Stern
*Attorneys*—R. S. Sciascia, Arthur L. Branning, J. G. Murray and M. L. Crane

ABSTRACT: This disclosure is directed to an apparatus and method of removing speckle patterns from objects illuminated with a laser. The laser beam is directed onto or through a beam divider or beam splitter to separate the laser beam into many separate laser beams such that speckle patterns cancel each other when reflected off a surface.

INVENTOR
RICHARD G. BUCKLES

INVENTOR
RICHARD G. BUCKLES

3,633,999

REMOVING SPECKLE PATTERNS FROM OBJECTS ILLUMINATED WITH A LASER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an apparatus and method of removing speckle patterns in optical systems and more particularly to an apparatus and method of removing speckle patterns in systems which make use of a laser beam for its light source.

It is well known in the prior art that all objects illuminated with a laser beam or any other source of spatially coherent light, a fine grained speckle pattern is distributed over the surface and is invariant with respect to time, that is, if the object is immobile. This speckle is due to the finite roughness of all surfaces. The laser beam, being coherent, reflects off the surface at various angles and randomly interferes with itself in space. Thus, since the beam is coherent, constructive and destructive interference occurs and these appear to the eye as speckle. Examination of the speckle reveals that it is microscopic in detail and also occurs when a translucent object is illuminated with a laser and viewed in the transmission mode. This speckle is so objectionable, that for most microscopic subjects, the laser cannot be used for the visualization of fine detail. Microscopists have found lasers unsuitable as light sources due to the degradation of images by the speckle. Speckle is of great concern in optical systems and has caused undue light scattering in critical regions like optical computer memory systems, in the area of holography and in optical data processing the speckle has caused untold difficulties in achieving desired results.

Heretofore, various methods of reducing speckle with continuous wave lasers has been tried without satisfaction. One such system is set forth in U.S. Pat. No. 3,490,827. This patented system makes use of a rotating ground glass which is rotated within the laser beam for scattering the light source. The major difficulty with the rotating glass system is the loss of light due to refraction and backscattering. Another prior art system made use of optical mask and filters which were designed to reduce speckle in objects in simple geometry. The use of optical masks are limited in the types of objects that can be illuminated. Even though complicated masks can be made optically, if a sequence of holograms are desired to be taken of a changing object, a new mask is required for each hologram. In addition, this technique is not applicable to direct observation of an object illuminated with a laser. Still another system may be used which requires several lasers to illuminate an object, the fringe visibility of the speckle is reduced to a tolerable level by such system. It is noted that each laser beam is coherent with itself, but not with the other beams. Therefore, several holograms are recorded on the recording emulsion and these require the same several laser beams to be present for illumination of the reconstruction. The use of many lasers is both costly and requires considerable skill in alignment and good stabilization. Therefore, each of the systems herein set forth has their drawbacks.

SUMMARY OF THE INVENTION

This invention is directed to an apparatus and method of removing speckle patterns produced by a light beam incident on objects. The invention is directed to an optical system which includes a collimated laser light source within which is placed one or more beam splitters. The beam splitters operate to produce a multiple number of coherent beams from the single beam produced by the laser. A plurality of mirrors are used in cooperation with the beam splitter to direct the separate beams back into a single path for use in holography or in microscopic work. The mirrors are placed such that the light paths are not equal to each other over the coherence length of the beam, such that the beams are coherent with themselves but incoherent with each other.

STATEMENT OF THE OBJECTS

It is therefore an object of the present invention to provide a system of removing speckle in any object illuminated with a laser.

Another object is to provide a system for removing speckle in a laser beam system which does not require any special object geometry.

Still another object is to provide a system for removing speckle which is economical and is easy to service and to maintain alignment of the relative optical parts.

Yet another object is to provide a system which has a relatively small loss of light in the optical system.

DESCRIPTION OF THE INVENTION

Figure 1:
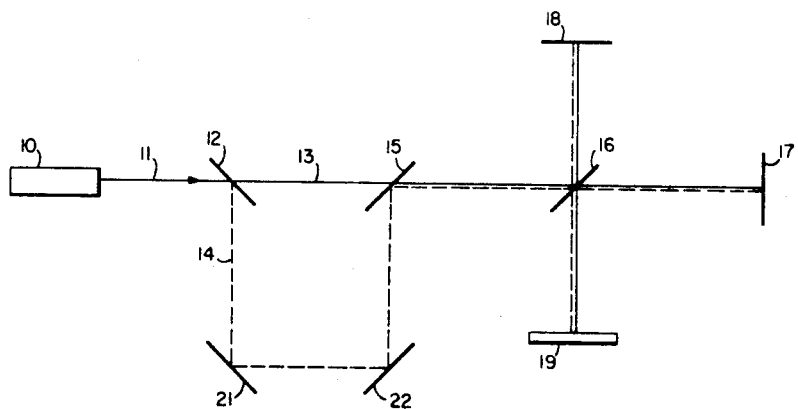
FIG. 1 illustrates in simple form a laser light beam split into two separate beams.

Now referring to the drawings there is shown by illustration in FIG. 1 a continuous wave laser 10 which produces a coherent light beam 11 which is incident on a beam splitter 12. The beam splitter 12 splits the light beam into two separate coherent light beams 13 and 14, shown in solid and dotted lines, respectively. The light beam 13 continues through partially reflective mirrors 15 and 16 and is reflected back by mirror 17 onto mirror 16 which directs the light onto a recorder or film 19. Light beam 14 is directed by the beam splitter along a different path than that of light beam 13 such that the light path is made longer. Light beam 14 is reflected by the beam splitter 12 onto a fully reflective mirror 21 which is at an angle to the incident light beam which then reflects the light beam 14 onto a second fully reflective mirror 22. The fully reflective mirror 22 reflects the light beam 14 onto partially reflective mirror 15 which reflects light beam 14 onto partially reflective mirror 16. The light beam 14 is both reflected and passes through the partially reflective mirror 16 and is incident onto mirrors 17 and 18 from which it is reflected back to the partially reflected mirror 16. The partially reflected mirror 16 then directs the light beam 14 onto the recorder or film 19. Since the original laser light beam was coherent prior to being split each of the separate light wave beams are coherent. Since the optical path of one light beam is longer than the other light beam by a distance greater than the coherence length of the two light beams when brought together by the optical system are then incoherent with each other. It is noted in FIG. 1 that mirrors 17 and 18 are equal distance from the beam splitters 16, therefore, each of the separate laser beams travel over equal light paths after being split for the second time by the beam splitter 16. When the laser beams are reflected back to the beam splitter 16 the two beams then recombine and will interfere constructively with each other. That is the light beam 13 having been split the second time will constructively interfere with the light beams that travel over the same distance. Likewise, the light beam 14 being split and traveling over the same distance will constructively interfere with each other. However, since the light beams 13 and 14 are incoherent with each other due to each light beam having traveled over different path lengths, no further combination will occur that will produce interference fringes between the two light paths 13 and 14.

Figure 2:
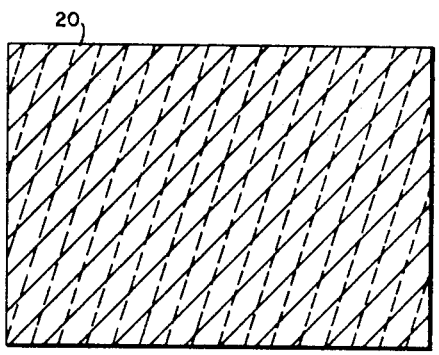
FIG. 2 illustrates the interference pattern viewed on the viewing screen in FIG. 1.

FIG. 2 illustrates the fringe patterns that result from the light beams having traversed different lengths of travel. The two light beams do not overlap in general because of one's inability to accurately superimpose the two beams. Since a speckle pattern is an example of constructive and destructive interference of a coherent beam with itself, the array shown in FIG. 1 will produce two standing speckle patterns on the screen such as shown in FIG. 2. Because the two patterns are random, the two patterns will not coincide. Rather, they will tend to cancel each other out. If several such speckle patterns are overlaid as a result of splitting the laser beam into several separate laser beams, the result will be a greatly reduced fringe visibility.

Figure 3:
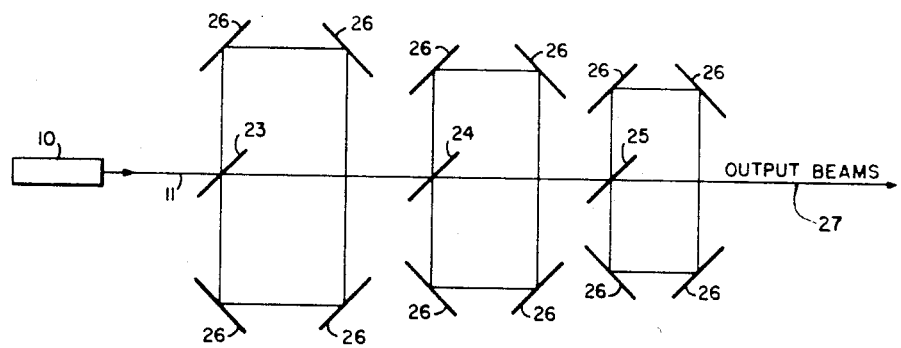
FIG. 3 illustrates a laser beam split into several different beams.
Figure 4:
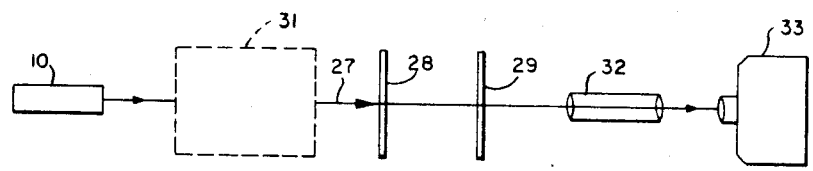
FIG. 4 illustrates a laser light beam split into several beams in combination with a microscope and recording means.

FIG. 3 illustrates one of several ways that a single laser light beam may be divided into several beams without losing beam coherence; however, the beams are so arranged that all of the beams are incoherent with the other beams. The system shown in FIG. 3 will produce eight beams of approximately equal intensity and an infinity of lower intensity beams. FIG. 3 illustrates three separate optical paths which include beam splitters 23, 24 and 25, each of which split the beams into two paths wherein one beam is reflected back onto the beam splitter by optical mirrors 26. The two beams from beam splitter 23 are directed onto beam splitter 24, wherein the two beams then are split into four beams, and then directed from beam splitter 24 onto beam splitter 25 wherein there are now four beams which are split into eight beams. This is carried out for as many times as the number of separate beams desired. The output light beam 27 which is produced or directed from the end beam splitter such as beam splitter 25 is then directed through the usual optical system as is previously done in the prior art. Such a system is shown in FIG. 4 wherein the beam splitter section shown in FIG. 3 is indicated in block form 31 in FIG. 4 and the light output beam bundle 27 is directed into a microscope 32. As shown, the light beams developed by the beam splitter are directed through a diffuser 28 which then directs the beams through the objects 29 and then through the optical section of the microscope wherein a camera or any other suitable recording means 33 is used for reproducing the image of the object. The light beam developed by the beam splitters could replace the laser and its light beam such as shown in U.S. Pat. No. 3,490,827 for producing holograms without any speckle and also may be used in the microscope structure as shown in FIG. 5 of the patent.

The major advantage in the present system is that the speckle which normally appears in holograms in the prior art devices is removed before the hologram is recorded whereas in the prior art devices speckle is removed during reconstruction of the hologram.

In the prior art devices a single beam of coherent light is directed from a laser source onto an object wherein many points of the object are reflected. Light is reflected by many points of the object onto a recording medium. In this invention, there are produced many individual coherent light beams, each of which are incident onto an object wherein many reflections of each of the separate coherent light beams are directed from the object onto the recording beam. In this invention each of the separate coherent light beams are incoherent with each other. It is possible to divide a laser beam into 'n' beams that are coherent with themselves but incoherent with each other wherein the output 17 varies from one to infinity. In this way one may use a single laser to produce enough independent beams so their respective speckle patterns will cancel each other and reduce the fringe visibility to a tolerable level. Each beam is coherent and able to interfere with itself. Thus, such a device may be used for holography or other optical applications where light coherence is a requirement. However, this system will work only with lasers that have a finite coherence length.

This invention has been described making use of optical beam splitters, however, it will be obvious to those skilled in the art that beam splitting may be performed by other means to produce an output beam of many coherent beams which are incoherent with each other.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical system for reducing speckle resulting from illumination of an object of concern by a coherent continuous wave laser light beam of limited coherence length which comprises:

a beam splitter positioned to receive an incident coherent continuous wave laser light beam of limited coherence length for dividing said light beam into first and second coherent beams, said first beam continuing in a line with said incident beam along a first optical path and said second beam directed at an angle with respect to said first beam through a second optical path, a first partially reflective mirror in optical alignment with said beam splitter and spaced therefrom for receiving said first beam and passing said first beam therethrough on the same line, first and second fully reflective mirrors positioned relative to said beam splitter and said partially reflective mirror, respectively, to define said optical path, said first fully reflective mirror receiving said second beam and reflecting said second beam onto said second fully reflective mirror, said second fully reflective mirror reflecting said second beam onto said partially reflective mirror, the length of said optical paths between said beam splitter and said first partially reflective mirror being different by more than said coherence length, said partially reflective mirror reflecting said second beam along the same optical path as said first beam, a second partially reflective mirror in optical alignment with said first partially reflective mirror for receiving a composite beam including said first and said second coherent light beams in which said first and second coherent beams are incoherent with respect to each other, a third fully reflective mirror centered optically on a line with said composite beam, and a fourth fully reflective mirror in optical alignment with said second partially reflective mirror on a line at an angle relative to said composite beam and positioned a distance equal to the distance said third fully reflective mirror is positioned from said second partially reflective mirror, whereby a portion of each beam of said composite beam incident on said second partially reflective mirror is directed to said third fully reflective mirror and a portion is reflected to said fourth fully reflective mirror, said third and fourth fully reflective mirrors reflecting said beams incident thereon back onto said second partially reflective mirrors which recombines said beams into a composite beam and directs said composite beam in a line relative thereto toward an object of interest.

2. An optical system for reducing speckle resulting from illumination of an object of concern by a coherent continuous wave laser light beam which comprises:

first, second, and third beam splitters in optical alignment and spaced from each other along a linear line, said first beam splitter positioned to receive an incident coherent continuous wave laser light beam of limited coherence length for dividing said light beam into first and second beams, said first beam continuing in a line with said incident beam to said second beam splitter, said second beam directed at an angle relative to said first beam, a first plurality of fully reflective mirrors positioned relative to said first beam splitter in optical alignment for reflecting said second beam along an optical path which is longer in length than said first beam path by a distance greater than the coherence length of said continuous beam and reflecting said second beam back onto said first beam splitter along a continuous optical path, said first beam splitter reflecting said second beam along the same optical path as said first beam to said second beam splitter, said second beam splitter dividing said first beam into third and fourth beams and said second beam into fifth and sixth beams, said third and fifth beams continuing through said second beam splitter to said third beam splitter, said fourth and sixth beams being reflected at an angle relative to said third and fifth beams, a second plurality of fully reflective mirrors positioned relative to said second beam splitter in optical alignment for reflecting said fourth and sixth beams back onto said second beam splitter along a continuous optical path, said second beam splitter reflecting said fourth and sixth beams along the same optical path as said third and fifth beams to said third beam splitter, said third beam splitter dividing the incident beams into $2n$ beams, where $n$ is the number of beams incident thereon, said third beam splitter passing $n$ number of beams therethrough along a line and reflecting $n$ number of beams at an angle relative thereto, said beams reflected at an angle relative to said third beam splitter being optically reflected back onto said third beam splitter being optically reflected back onto said third beam splitter and reflected thereby along the same optical path with said $n$ number of beams passed therethrough, all said different light paths differing in length by a distance greater than the coherence length of said continuous wave laser beam, whereby the combined $2n$ beams are directed along the same optical path onto an object to be illuminated with the individual beams being coherent but incoherent with respect to each other.

* * * * *